(12) United States Patent
Crow et al.

(10) Patent No.: US 6,453,357 B1
(45) Date of Patent: Sep. 17, 2002

(54) METHOD AND SYSTEM FOR PROCESSING FRAGMENTS AND THEIR OUT-OF-ORDER DELIVERY DURING ADDRESS TRANSLATION

(75) Inventors: James J. Crow; Kip R. McClanahan; Satyanarayana B. Rao, all of Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,048

(22) Filed: Jan. 7, 1999

(51) Int. Cl.⁷ .............................................. G06F 15/16
(52) U.S. Cl. ...................... 709/236; 709/230; 709/235; 709/238; 709/242; 709/245; 370/351; 370/473; 370/474; 370/475; 370/476; 359/117; 379/219; 379/220; 379/242; 710/1; 710/3
(58) Field of Search ................................. 709/235, 236, 709/238, 230, 242, 245; 359/117; 379/219, 220, 242; 370/473, 474, 475, 476, 351; 710/1, 3

(56) References Cited

U.S. PATENT DOCUMENTS

| | | |
|---|---|---|
| 4,771,425 A | 9/1988 | Baran et al. ................... 370/85 |
| 4,819,228 A | 4/1989 | Baran et al. ................... 370/85 |
| 4,903,261 A | 2/1990 | Baran et al. ................ 370/94.2 |
| 4,975,906 A | 12/1990 | Takiyasu et al. .......... 370/85.13 |
| 4,985,889 A | 1/1991 | Frankish et al. ........... 370/94.1 |
| 5,020,058 A | 5/1991 | Holden et al. ............... 370/109 |
| 5,059,925 A | 10/1991 | Weisbloom .................. 331/1 A |
| 5,072,449 A | 12/1991 | Enns et al. ................. 371/37.1 |
| 5,088,032 A | 2/1992 | Bosack ....................... 395/200 |
| 5,113,392 A * | 5/1992 | Takiyasu et al. ............. 370/473 |
| 5,115,431 A | 5/1992 | Williams et al. ........... 370/94.1 |
| 5,119,403 A | 6/1992 | Krishnan ...................... 375/39 |
| 5,128,945 A | 7/1992 | Enns et al. ................. 371/37.1 |
| 5,224,099 A | 6/1993 | Corbalis et al. ............ 370/94.2 |
| 5,255,291 A | 10/1993 | Holden et al. .............. 375/111 |
| 5,274,631 A | 12/1993 | Bhardwaj ..................... 370/60 |
| 5,274,635 A | 12/1993 | Rahman et al. ............ 370/60.1 |
| 5,274,643 A | 12/1993 | Fisk .......................... 370/94.1 |
| 5,313,454 A | 5/1994 | Bustini et al. ................. 370/13 |

(List continued on next page.)

FOREIGN PATENT DOCUMENTS

| | | |
|---|---|---|
| WO | WO 95/20282 | 7/1995 |
| WO | WO 96/04729 | 2/1996 |

OTHER PUBLICATIONS

"Utopia Specification Level 1, Version 2.01," (af–phy–0017.000), *The ATM Forum Committee*, Mar. 21, 1994, 19 pages.

Anthony Alles, "ATM Internetworking," *Cisco Systems, Inc.*, May 1995, 59 pages.

"Utopia Level 2, Version 1.0," (af–phy–0039.000), *The ATM Forum Committee*, Jun. 1995, 69 pages.

*Primary Examiner*—Saleh Najjar
(74) *Attorney, Agent, or Firm*—Baker Botts L.L.P.

(57) ABSTRACT

A set of packetized fragments in which only a portion of the fragments carry translation information for the set of fragments is translated by storing in a memory fragments received before the translation information. In response to receiving the translation information, the fragments stored in the memory are translated based on the translation information. After receipt of the translation information, fragments are translated as they are received based on the translation information.

23 Claims, 2 Drawing Sheets

U.S. PATENT DOCUMENTS

| | | | |
|---|---|---|---|
| 5,317,562 A | | 5/1994 | Nardin et al. ................. 370/16 |
| 5,337,313 A | * | 8/1994 | Buchholz et al. ........... 370/394 |
| 5,359,592 A | | 10/1994 | Corbalis et al. .............. 370/17 |
| 5,394,394 A | | 2/1995 | Crowther et al. ............. 370/60 |
| 5,422,880 A | | 6/1995 | Heitkamp et al. ............ 370/60 |
| 5,430,715 A | | 7/1995 | Corbalis et al. .............. 370/54 |
| 5,434,863 A | | 7/1995 | Onishi et al. ............ 370/85.13 |
| 5,440,545 A | * | 8/1995 | Buchholz et al. ........... 370/426 |
| 5,452,306 A | | 9/1995 | Turudic et al. .......... 370/110.1 |
| 5,459,723 A | * | 10/1995 | Thor .......................... 370/392 |
| 5,461,624 A | | 10/1995 | Mazzola ................. 370/85.13 |
| 5,473,599 A | | 12/1995 | Li et al. ....................... 370/16 |
| 5,473,607 A | | 12/1995 | Hausman et al. ........ 370/85.13 |
| 5,509,006 A | | 4/1996 | Wilford et al. ............... 370/60 |
| 5,517,488 A | | 5/1996 | Miyazaki et al. ............. 370/16 |
| 5,519,704 A | | 5/1996 | Farinacci et al. ........ 370/85.13 |
| 5,541,919 A | * | 7/1996 | Yong et al. ................. 370/416 |
| 5,555,244 A | | 9/1996 | Gupta et al. ............... 370/60.1 |
| 5,561,663 A | | 10/1996 | Klausmeier ................. 370/17 |
| 5,561,669 A | | 10/1996 | Lenney et al. ............ 370/60.1 |
| 5,566,170 A | * | 10/1996 | Bakke et al. ................ 370/392 |
| 5,570,360 A | | 10/1996 | Klausmeier et al. .......... 370/60 |
| 5,583,859 A | * | 12/1996 | Feldmeier ................... 370/471 |
| 5,583,862 A | | 12/1996 | Callon ........................ 370/397 |
| 5,588,000 A | * | 12/1996 | Rickard ...................... 370/428 |
| 5,590,122 A | * | 12/1996 | Sandorfi et al. ............ 370/394 |
| 5,598,581 A | | 1/1997 | Daines et al. .............. 395/872 |
| 5,602,850 A | * | 2/1997 | Wilkinson et al. .......... 370/462 |
| 5,602,853 A | * | 2/1997 | Ben-Michael et al. ...... 370/474 |
| 5,604,741 A | | 2/1997 | Samueli et al. ............. 370/402 |
| 5,612,957 A | | 3/1997 | Gregerson et al. .......... 370/401 |
| 5,617,417 A | | 4/1997 | Sathe et al. ................. 370/394 |
| 5,617,421 A | | 4/1997 | Chin et al. .................. 370/402 |
| 5,629,933 A | * | 5/1997 | Delp et al. .................. 370/411 |
| 5,648,970 A | * | 7/1997 | Kapoor ....................... 370/462 |
| 5,666,353 A | | 9/1997 | Klausmeier et al. ........ 370/230 |
| 5,673,265 A | | 9/1997 | Gupta et al. ................ 370/432 |
| 5,684,791 A | * | 11/1997 | Raychaudhuri et al. ..... 370/278 |
| 5,689,505 A | * | 11/1997 | Chiussi et al. .............. 370/388 |
| 5,691,997 A | | 11/1997 | Lackey, Jr. .................. 371/53 |
| 5,729,546 A | | 3/1998 | Gupta et al. ................ 370/434 |
| 5,732,079 A | | 3/1998 | Castrigno ................... 370/362 |
| 5,737,526 A | | 4/1998 | Periasamy et al. ..... 395/200.06 |
| 5,737,635 A | | 4/1998 | Daines et al. .............. 395/872 |
| 5,740,171 A | | 4/1998 | Mazzola et al. ............ 370/392 |
| 5,740,176 A | | 4/1998 | Gupta et al. ................ 370/440 |
| 5,742,604 A | | 4/1998 | Edsall et al. ................ 370/401 |
| 5,742,649 A | | 4/1998 | Muntz et al. ............... 375/371 |
| 5,764,636 A | | 6/1998 | Edsall ........................ 370/401 |
| 5,764,641 A | | 6/1998 | Lin ............................. 370/412 |
| 5,765,032 A | | 6/1998 | Valizadeh .............. 395/200.65 |
| 5,781,549 A | * | 7/1998 | Dai ............................ 370/398 |
| 5,787,070 A | | 7/1998 | Gupta et al. ................ 370/217 |
| 5,787,255 A | | 7/1998 | Parlan et al. .......... 395/200.63 |
| 5,793,763 A | | 8/1998 | Mayes et al. ............... 370/389 |
| 5,793,978 A | | 8/1998 | Fowler .................. 395/200.56 |
| 5,796,732 A | | 8/1998 | Mazzola et al. ............ 370/362 |
| 5,802,042 A | | 9/1998 | Natarajan ................... 370/255 |
| 5,805,595 A | | 9/1998 | Shaper et al. ............... 370/442 |
| 5,812,618 A | | 9/1998 | Muntz et al. ............... 375/372 |
| 5,815,516 A | * | 9/1998 | Aaker et al. ................ 714/807 |
| 5,822,383 A | | 10/1998 | Muntz et al. ............... 375/362 |
| 5,834,494 A | | 11/1998 | Hughes et al. .............. 370/397 |
| 5,835,036 A | | 11/1998 | Takefman .................... 341/95 |
| 5,835,481 A | | 11/1998 | Akyol et al. ................ 370/216 |
| 5,835,725 A | | 11/1998 | Chiang et al. .......... 395/200.58 |
| 5,838,915 A | | 11/1998 | Klausmeier et al. ... 395/200.45 |
| 5,838,994 A | | 11/1998 | Valizadeh ................... 395/876 |
| 5,859,550 A | | 1/1999 | Brandt ........................ 327/156 |
| 5,864,542 A | | 1/1999 | Gupta et al. ................ 370/257 |
| 5,867,666 A | | 2/1999 | Harvey .................. 395/200.68 |
| 5,870,394 A | * | 2/1999 | Oprea ........................ 370/392 |
| 5,949,799 A | * | 9/1999 | Grivna et al. ............... 370/258 |
| 5,978,951 A | * | 11/1999 | Lawler et al. ............... 714/758 |
| 6,026,093 A | * | 2/2000 | Bellaton et al. ............. 370/412 |
| 6,044,079 A | * | 3/2000 | Calvignac et al. .......... 370/395 |
| 6,046,999 A | * | 4/2000 | Miki et al. .................. 370/395 |
| 6,091,733 A | * | 7/2000 | Takagi et al. ............... 370/401 |
| 6,111,874 A | * | 8/2000 | Kerstein ..................... 370/389 |
| 6,137,798 A | * | 10/2000 | Nishihara et al. ........... 370/392 |
| 6,147,996 A | * | 11/2000 | Laor et al. .................. 370/394 |
| 6,154,460 A | * | 11/2000 | Kerns et al. ................ 370/398 |
| 6,157,955 A | * | 12/2000 | Narad et al. ................ 709/228 |
| 6,160,793 A | * | 12/2000 | Ghani et al. ................ 370/236 |
| 6,185,208 B1 | * | 2/2001 | Liao ........................... 370/392 |
| 6,185,620 B1 | * | 2/2001 | Weber et al. ................ 709/230 |
| 6,246,684 B1 | * | 6/2001 | Chapman et al. ........... 370/394 |

\* cited by examiner

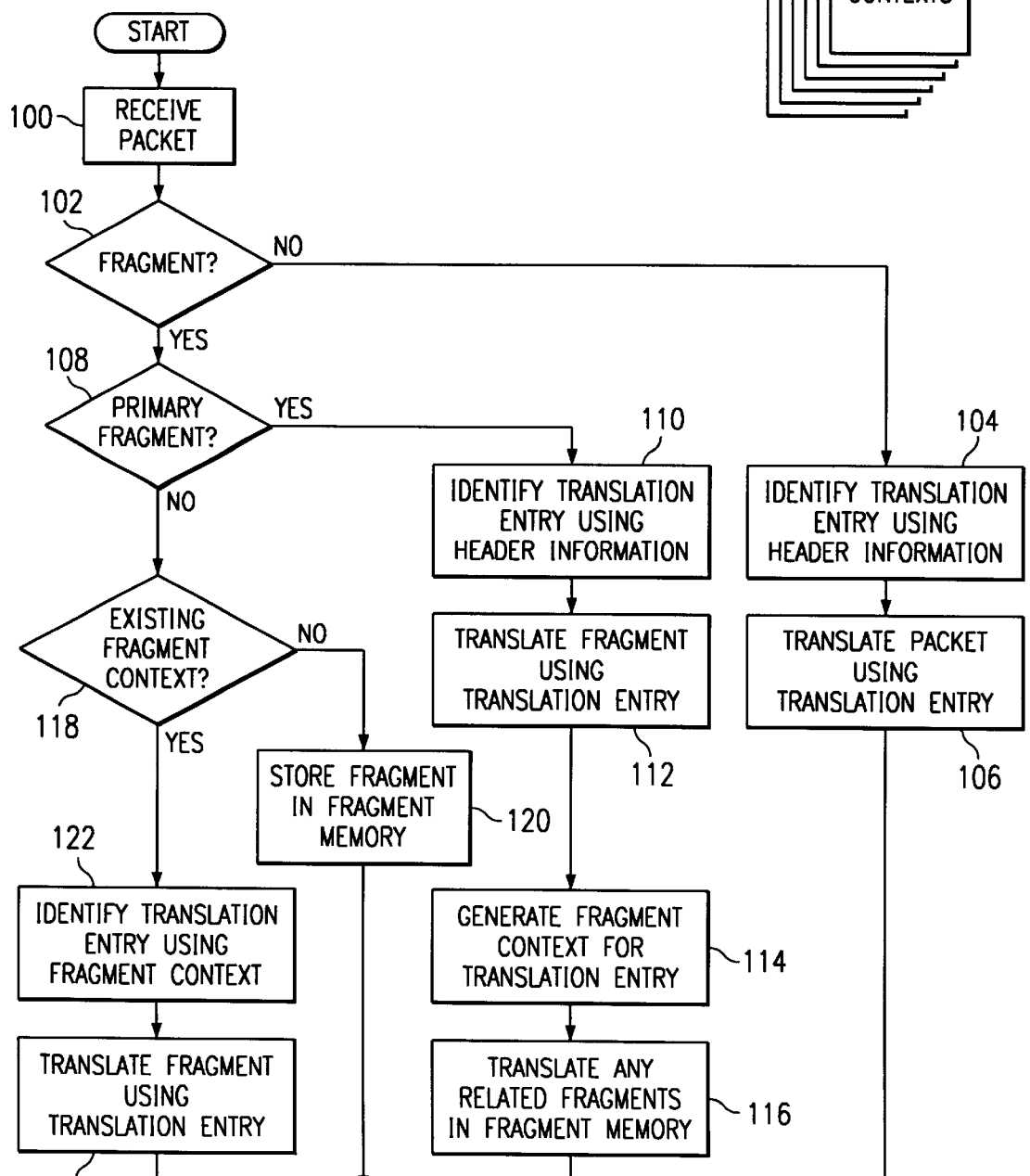

METHOD AND SYSTEM FOR PROCESSING FRAGMENTS AND THEIR OUT-OF-ORDER DELIVERY DURING ADDRESS TRANSLATION

TECHNICAL FIELD OF THE INVENTION

This invention relates generally to the field of network addressing, and more particularly to a method and system for processing fragments and their out-of-order delivery during address translation.

BACKGROUND OF THE INVENTION

Due to the success of the Internet, the Internet Protocol (IP) has become the primary networking protocol. Major concerns of the Internet community are the depletion of global IP address space (IPV4) and the complexity of configuring hosts with global IP addresses for Internet access. To extend the life of current IP address space and provide configureless access, network address translation (NAT) and its extension, port address translation (PAT), have been employed.

Network address translation supports connectivity between the Internet and hosts using private addressing schemes. This connectivity provides configureless access to the Internet in that hosts may have independently assigned, globally non-unique addresses that need not be coordinated with the Internet Address Numbering Association (IANA) or other Internet registry. Network address translation pairs up the private addresses to public addresses so that the inside IP addresses appear as legally registered IP addresses on the Internet.

Port address translation allows a number of private network addresses and their ports to be translated to a single network address and its ports. Thus, multiple hosts in a private network may simultaneously access the Internet using a single legally registered IP address. The registered IP address is typically assigned to a router that translates addressing information contained in message headers between the addressing schemes.

Port address translation uses transport layer header information (protocol, port, etc.) to uniquely translate and direct IP traffic to the correct receiver. IP fragments, other than the first fragment, however, do not carry any transport layer protocol information. Thus, when IP fragments are delivered out-of-order, which is common with IP traffic, the IP fragments cannot be translated unless the first fragment of the packet is already received. As a result, the fragments are discarded and the data must be resent. This leads to delays in obtaining information and increased traffic on the Internet.

SUMMARY OF THE INVENTION

The present invention provides a method and system for translating addressing information for packetized fragments that substantially eliminate or reduce disadvantages and problems associated with previously developed systems and methods. In particular, the present invention stores fragments delivered out-of-order until additional fragments are received having address translation information with which the stored fragments may be translated.

In accordance with one embodiment of the present invention, a set of packetized fragments in which only a portion of the fragments carry translation information for the set of fragments is translated by storing in a memory fragments received before the translation information. In response to receiving the translation information, the fragments stored in the memory are translated based on the translation information. After receipt of the translation information, fragments are translated as they are received based on the translation information.

More particularly, in accordance with a particular embodiment of the present information, the translation information is address translation information and each fragment is translated by translating addressing information for the fragment. In this embodiment, the fragments may be Internet Protocol (IP) fragments in which only the first fragment carries the translation information. Address translation is performed in accordance with Network Address Translation (NAT) and Port Address Translation (PAT).

The technical advantages of the present invention include providing a method and system for processing fragments during address translation. In addition, it also provides a method and system for processing fragments delivered out-of-order. In particular, fragments delivered out-of-order without address translation information are stored until the address translation information is received. At that time, addressing information for the stored fragments is translated and the fragments are directed to that address. Accordingly, out-of-order fragments need not be discarded nor retransmitted. Thus, any delay is minimized and network traffic reduced.

Another technical advantage of the present invention extends network and port address translation capabilities to forward IP traffic without compromise. This capability makes network and port address translation highly deployable and useful. Moreover, resource impact is minimized by creating fragment-context and searching only when needed. Requirements for dynamic memory objects are also kept to a minimum by using aging timers for both fragment-context and stored fragments.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 3 illustrates details of a translation entry and associated fragment-context in accordance with one embodiment of the present invention; and FIG. 4 is a flow diagram illustrating a computer method for translating addressing information for packetized fragments in accordance with one embodiment of the present invention.

DETAILED DESCRIPTION OF THE INVENTION

Figure 1:
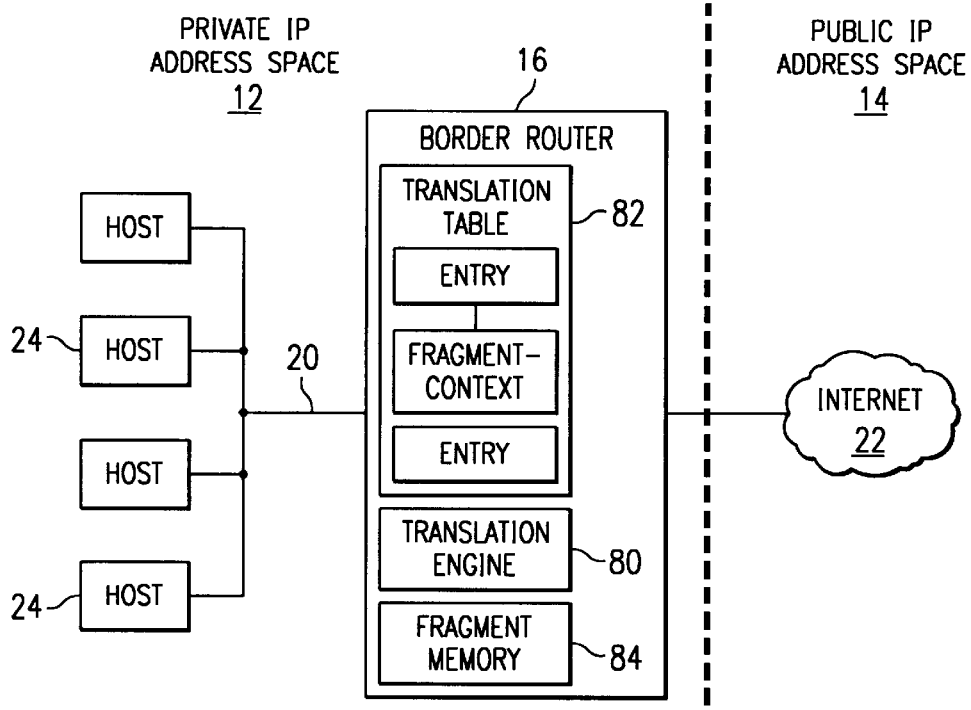
FIG. 1 is a block diagram illustrating a router for translating addressing information between private and public address spaces in accordance with one embodiment of the present invention.

FIG. 1 is a block diagram illustrating a private addressing space 12, a public addressing space 14, and a border router 16 disposed between the private and public address spaces 12 and 14 for translating addresses between the spaces. For the embodiment of FIG. 1, the private address space 12 is an Intranet 20 and the public address space 14 is the Internet 22. It will be understood that the private and public address spaces 12 and 14 may be other suitable types of networks using disparate addressing systems.

The Intranet 20 includes an inside network connecting a plurality of remote hosts 24 to the router 16. The inside network is a local area network (LAN), a wide area network (WAN), or the suitable type of link capable of communicating data between the hosts 24 and the router 16. For the local area network embodiment, the inside network may be an Ethernet. The Internet 22 can be other types of outside networks such as a local area network (LAN) or public Internet which employs the outside addressing scheme. Translation function translates network address information between these two schemes whenever packets cross the boundary which is router 16.

The hosts 24 are each a computer such as a personal computer, file server, workstation, minicomputer, mainframe, or any general purpose or other computer or device capable of communicating with other computers or devices over a network. For the personal computer embodiment, the hosts 24 each include input devices, output devices, processors, and memory. The input devices may include a pointing device such as a mouse, keyboard, or the like. The output devices may include a monitor, a printer, or the like.

In a particular embodiment, the hosts 24 are each assigned a private Intranet Protocol (IP) address for communication within the Intranet 20. The router 16 is assigned a public Internet Protocol (IP) address and uses port address translation (PAT) to translate the private IP addresses to the public IP address for communication on the Internet 22. It will be understood that other suitable types of addressing protocols and translation may be used in and between the private and public addressing spaces 12 and 14. For example, network address translation (NAT) or a similar system may be used to translate private IP or other addresses to public IP or other addresses.

Figure 2A:
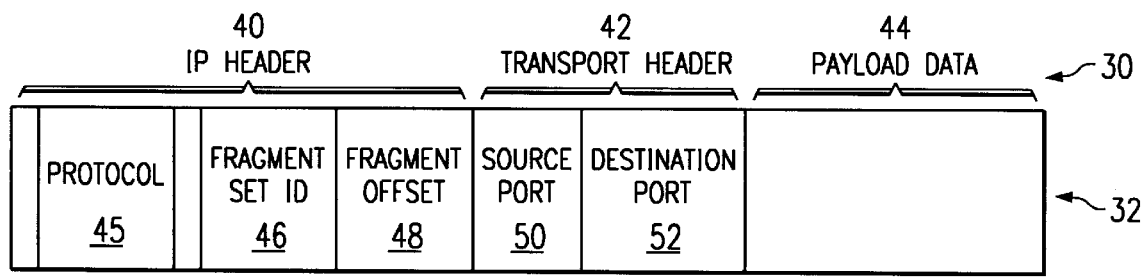
FIGS. 2A–B illustrate details of primary and secondary fragments in accordance with one embodiment of the present invention.
Figure 2B:
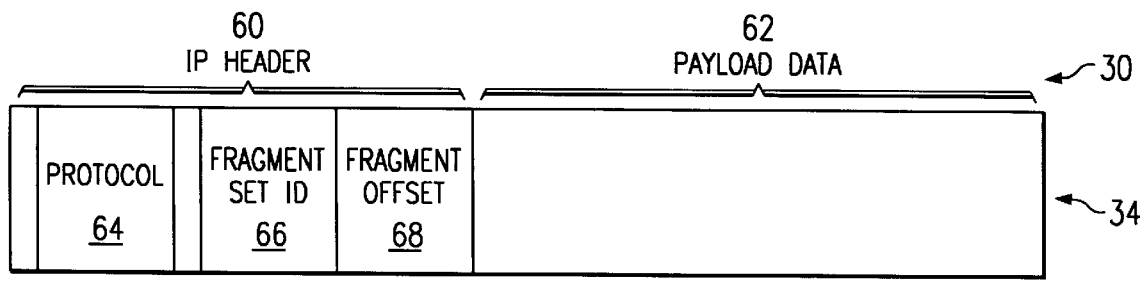

FIGS. 2A–B illustrate details of IP fragments 30 for transmitting messages over and between the Intranet 20 and Internet 22. In this embodiment, a first fragment 32 is a primary fragment carrying address translation information for the set of fragments. Address translation information is information transmitted with one or more fragments and is needed to translate at least one other fragment in the set of fragments. The remaining fragments in the set are secondary fragments 34 without addressing information. The secondary fragments 34 are without address translation information in that they are dependent on addressing information transmitted in the primary packet or packets. It will be understood that the method and system of the present invention may be used in connection with other types of packetized fragments in which only a portion of the fragments carry translation information for the set of fragments.

Referring to FIG. 2A, the primary fragment 32 includes an IP header 40 and a transport header 42 for directing payload data 44. The payload data 44 comprises a fragment of a message generated by an application for transmission to and use by a remote application. Such data may be requesting information from or supplying information to the remote application. The message is fragmented due to maximum length limitation for the underlying network interface, which allows for efficient routing.

The IP header 40 includes protocol data 45, a fragment set ID 46, and a fragment offset 48. The protocol data 45 identifies the packet protocol for the primary fragment 32. The fragment set ID 46 identifies the fragment set to which the primary fragment 32 belongs. The fragment offset 48 identifies the number of the primary fragment 32. For the IP embodiment, the fragment offset is one identifying that the primary fragment 32 is the first fragment of the set. The fragment set ID and offset 46 and 48 allow fragments in the set to be identified, associated and ordered.

The transport header 42 includes a source port 50 and a destination port 52. The source port 50 identifies the port transmitting the fragment set. The destination port 52 identifies the port to which the fragment set is destined. As described in more detail below, port address translation uses the protocol data and ports 45, 50, and 52 in the IP and transport headers 40 and 42 to uniquely translate and direct the IP fragments to the appropriate receiver.

Referring to FIG. 2B, the secondary fragment 34 includes an IP header 60 for directing payload data 62 and for associating the data with the payload data 44 in the primary fragment 32 and with payload data in other secondary fragments 34. Together, the payload data 44 and 62 for the primary and secondary fragments 32 and 34 form a complete message generated by an application for transmission to and use by a remote application.

The IP header 60 includes protocol data 64, a fragment set ID 66, and a fragment offset 68 as previously described in connection with the IP header 40 of the primary fragment 32. The fragment set ID and offset 66 and 68 allow the secondary fragment 34 to be associated with the primary fragment 32 and ordered within the fragment set.

No transport header is provided in the secondary fragment 34. Instead, described in more detail below, information from the transport header 42 of the primary fragment 32 is used for translating the secondary fragment 34. This allows the secondary fragment 34 to carry an increased amount of the payload data 62.

Returning to FIG. 1, the router 16 includes computer software and data that is loaded into system memory and executed by one or more processes. The computer software and data are generally identified by tables, engines, memories, and the like. It will be understood that the computer software and data may be otherwise combined and/or divided for processing in or remotely from the router 16 and otherwise stored in a system or other suitable memory in or remotely from the router 16 without departing from the scope of the present invention. Accordingly, the labels of the table, engine, and memory are for illustrative purposes and may be suitably varied.

The router 16 may be a Cisco 675 router manufactured by Cisco Systems, Inc. or other suitable border router or device capable of translating addressing information between disparate addressing systems. The router 16 includes a translation engine 80, a translation table 82, and a fragment memory 84. The translation engine 80 uses the translation table 82 to translate addresses between the private and public address spaces 12 and 14.

For the IP embodiment, the translation engine 60 performs port address translation (PAT). Port address translation automatically establishes binding between the private IP addresses and the public IP address dynamically during initiation of a session. Port address translation uses the protocol and port data in the IP and transport headers to translate the larger number of private IP addresses to the smaller number of public IP addresses. In the IP embodiment, the translation engine 80 uses the protocol data and port information 45, 50, and 52 in the IP and transport headers 40 and 42 of the primary fragment 32 to translate addressing information for the primary fragment 32 and uses a fragment-context based on that protocol data and port information 45, 50 and 52 in the primary fragment 32 along with the IP header 60 of the secondary fragments 34 to associate and translate the secondary fragments 34. In particular, as described in more detail below, translation engine with Port Address Translation (PAT) creates fragment-context using the 16-bit fragment identification information in the IP header of every first fragment of every fragmented IP packet. This fragment-context 92 is associated with the address translation entry 90 used for translating the packet. Fragments received subsequent to creating fragment-context 92 can be translated using the address translation entry 90 that is associated with the fragment context 92 that matches the fragment-context of the current fragment. Further information concerning port address translation may be obtained from RFC 1631 and RFC 1918, published by Internet Engineering Task Force (IETF), which are hereby incorporated by reference.

The fragment memory 84 is a queue or any other suitable memory data structure capable of storing one or more secondary fragments 34. The fragment memory 84 allows secondary fragments 34 delivered out-of-order without address translation information to be saved for later translation. Accordingly, the out-of-order fragments need not be discarded nor retransmitted. Thus, delay is minimized and network traffic reduced.

In one embodiment, the fragment memory 84 stores secondary fragments 34 until the primary fragment 32 is received or a timer expires. Accordingly, secondary fragments 34 for which no primary fragment 32 will be received, may be aged and removed from the fragment memory 84. As a result, dynamic memory requirements are minimized.

FIG. 3 illustrates details of address translation entries 90 which are created dynamically using the addressing information in the IP header, transport protocol header in the IP packet. Fragmentation context 92 is created using the fragment identification field of the IP header. Fragment context 92 is associated with the translation entry 90 used for address translation. Therefore, the translation engine can easily associate a fragment with an address translation entry 90 using the fragment context 92.

Referring to FIG. 3, fragment context 92 is aged and deleted after the aging timers expire because fragment context 92 is of no use after all the fragments of a packet are received and translated. Therefore the timeout values for these fragment contexts 92 are very small. Address translation table search is also limited to matching IP addresses and port information if the packets are not fragments. Similarly fragment context 92 is created for only fragments with addressing information is received. This strategy, while minimizing the dynamic memory required for creating these objects, also makes address translation table and fragment context lookup very efficient.

FIG. 4 is a flow diagram illustrating a computer method for translating addressing information for packetized fragments in accordance with one embodiment of the present invention. In this embodiment, IP fragments 30 are translated using port address translation. It will be understood that the method of the present invention may be used in connection with other suitable types of addressing and translation systems.

Referring to FIG. 4, the method begins at step 100 in which a packet is received at the router 16. Next, at decisional step 102, the translation engine 80 determines if the packet is a fragment based on information in the packet header. If the packet is not a fragment, fragment processing is unnecessary and the No branch of decisional step 102 leads to step 104. At step 104, the translation engine 80 uses the information in the packet header to identify a translation entry 90 in the translation table 82. Next, at step 106, the translation engine 80 translates addressing information for the packet using the identified translation entry 90. Step 106 leads to the end of the process at which point translation is complete and the packet may be directed to the appropriate receiver.

Returning to decisional step 102, if the packet is a fragment, the Yes branch of decisional step 102 leads to decisional step 108. At decisional step 108, the translation engine 80 determines if the fragment 30 is a primary fragment 32 including address translation information. For IP fragments, this may be determined from the fragment offset 48 and/or 68. If the fragment 30 is a primary fragment 32, the Yes branch of decisional step 108 leads to step 110.

At step 110, the translation engine 90 identifies a translation entry 90 in the translation table 82 for the primary fragment 32 using the IP and transport header information 40 and 42. At step 112, the translation engine 80 translates addressing information for the primary fragment 32 using the identified translation entry 90. At this point, translation for the primary fragment 32 is complete and the primary fragment 32 may be directed to the appropriate receiver.

Proceeding to step 114, the translation engine 80 generates a fragment-context 92 for the identified translation entry. The fragment-context 92 may be any structure or data capable of associating secondary fragment 34 with address translation information for translating addressing information in the secondary fragments 34. As described in more detail below, the fragment-context 92 is used to associate secondary fragments 34 with the translation entry 90 in the translation table 82 to allow translation of the addressing information in the secondary fragments 34. In one embodiment, the fragment-context 92 is created using the 16-bit identification information in the IP header 40 of the primary fragment 32. The fragment-context 92 is associated with the translation entry 90 identified by the primary fragment 34. In this embodiment, the translation engine 80 may translate secondary fragments 34 by matching their IP header to the fragment-context 92 and using the associated entry 90 for translation.

Next, at step 116, the translation engine 80 translates each secondary fragment 34 that was previously received and stored in the fragment memory 84. As used herein, each means each of at least a subset of the identified items. Related fragments are those fragments having an IP header 60 matching the fragment-context 92. Accordingly, secondary fragments 34 delivered out-of-order are translated as soon as the primary fragment 32 is received at the router 16. It will be understood that the stored fragments may be otherwise translated in response to receiving the translation information. Thus, the translation need not be immediate or may be delayed by the occurrence or nonoccurrence of an intervening event.

Returning to decisional step 108, if the fragment 30 is not a primary fragment, then it is a secondary fragment 34 that cannot be translated on its own and the No branch of decisional step 108 leads to decisional step 118. At decisional step 118, the translation engine 80 determines if a fragment-context 92 exists for the secondary fragment 34. In one embodiment, this is determined by comparing the IP header 60 of the secondary fragment 34 to all fragment-contexts 92 in the translation table 82 to determine if a match exists. If a match does not exist, then the secondary fragment 34 has been received out-of-order before the primary fragment 32 and address translation information does not exist for translating the secondary fragment 34. Accordingly, the No branch of decisional step 118 leads to step 120. At step 120, the secondary fragment 34 is stored in the fragment memory 84 from which it can be later translated if the primary fragment 32 is timely received. Thus, the out-of-order fragment 34 is not discarded and the message of the fragment set need not be retransmitted. Accordingly, network delays and traffic are reduced.

Returning to decisional step 118, if an existing fragment-context 92 exists for the secondary fragments 34, the secondary fragments 34 may be translated and the Yes branch of decisional step 118 leads to step 122. At step 122, a translation entry 90 in the translation table 82 with which the matching fragment-context 92 is associated is identified. At step 124, the secondary fragment 34 is translated using the identified entry 90. Accordingly, after the primary fragment 32 has been received, later received secondary fragments 34 are translated as they are received. This way, out-of-order fragments are handled with minimal impact on translation and forwarding performance and system resources.

Although the present invention has been described with several embodiments, various changes and modifications may be suggested to one skilled in the art. It is intended that the present invention encompass such changes and modifications as fall within the scope of the appended claims.

What is claimed is:

1. A method for translating a set of packetized fragments in which only a portion of the fragments carry translation information for the set of fragments, comprising:
    storing in a memory fragments received before the translation information;
    receiving the translation information in one or more fragments;
    translating the fragments comprising translation information and the fragments stored in the memory based on the translation information; and
    after receipt of the translation information, translating fragments not stored in the memory and as they are received based on the translation information.

2. The method of claim 1, wherein the translation information is address translation information and each fragment is translated by translating addressing information for the fragment.

3. The method of claim 1, wherein the translation information is address translation information and each fragment is translated in accordance with a translation system selected from the group consisting of network address translation (NAT) and port address translation (PAT).

4. The method of claim 1, wherein only one fragment carries the translation information.

5. The method of claim 1, wherein the fragments are Internet Protocol (IP) packets.

6. The method of claim 1, wherein the fragments are Internet Protocol (IP) packets received from an internet link.

7. The method of claim 1, wherein the fragments comprising the translation information are received out of order after the fragments not comprising the translation information.

8. The system of claim 1, wherein the fragments comprising the translation information and the fragments not comprising translation information are received from a same source.

9. A method for translating addressing information for a set of packetized fragments including a primary fragment having address translation information for the set of fragments and a plurality of secondary fragments without address translation information, comprising:
    receiving a fragment;
    determining whether the address translation information carried by a primary fragment has been received;
    translating addressing information for the fragment based on the address translation information if the address translation information carried by a primary fragment has been received;
    storing the fragment for later translation if the address translation information carried by a primary fragment has not been received; and
    not storing the fragment for later translation if the address translation information carried by a primary fragment has been received.

10. The method of claim 9, further comprising determining whether the fragment is the translation fragment and, if the fragment is the primary fragment, generating based on the address translation information carried in the primary fragment a fragment-context for translating addressing information for the secondary fragments.

11. The method of claim 10, further comprising translating addressing information for previously stored secondary fragments using the fragment-context.

12. The method of claim 10, if the fragment is the primary fragment, further comprising translating addressing information for the primary fragment based on the address translation information carried in the primary fragment.

13. The method of claim 9, wherein the fragment is stored in a memory, further comprising deleting the fragment from the memory if the address translation information is not received within a specified period of time.

14. The method of claim 9, wherein addressing information is translated for each fragment in accordance with a translation system selected from the group consisting of network address translation (NAT) and port address translation (PAT).

15. The method of claim 9, wherein the fragments are Internet Protocol (IP) packets.

16. A system for translating addressing information for a set of packetized fragments including a primary fragment having address translation information for the set of fragments and a plurality of secondary fragments without address translation information, comprising:
    a fragment queue for storing secondary fragments received before the address translation information; and
    a translation engine operable to receive a fragment, to determine whether the address translation information carried by a primary fragment has been received, to translate addressing information for the fragment based on the address translation information if the address translation information carried by a primary fragment has been received, to store the fragment in the fragment queue for later translation if the address translation information carried by a primary fragment has not been received, and not store the fragment for later translation if the address translation information carried by a primary fragment has been received.

17. The system of claim 16, wherein the translation engine is further operable to determine whether the fragment is the primary fragment and, if the fragment is the primary fragment, to generate based on the address translation information carried in the primary fragment a fragment-context for translating addressing information for the secondary fragments.

18. The system of claim 17, wherein the translation engine is further operable to translate addressing information for previously stored secondary fragments using the fragment-context.

19. The system of claim 17, wherein the translation engine is further operable to translate addressing information for the primary fragment based on the address translation information carried in the primary fragment.

20. The system of claim 16, wherein the translation engine is further operable to delete the fragment from the fragment queue if the address translation information is not received within a specified period of time.

21. The system of claim 16, wherein the translation engine is operable to translate each fragment in accordance with a translation system selected from the group consisting of network address translation (NAT) and port address translation (PAT).

22. The system of claim 16, wherein the fragments are Internet Protocol (IP) packets.

23. The system of claim 16, wherein the system is a router.

* * * * *